Oct. 11, 1949.  J. F. PERRY, JR  2,484,461
TEA BAG AND BUFFET TONGS
Filed June 4, 1948
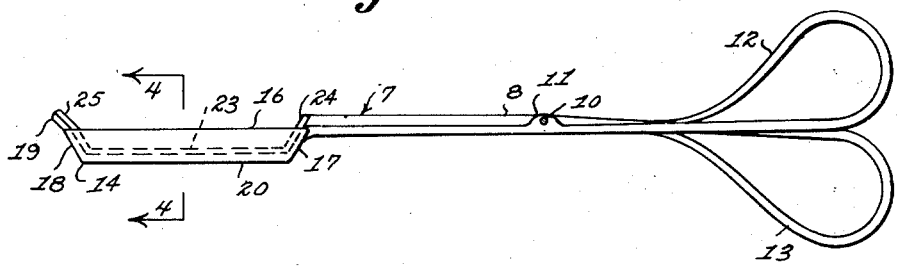
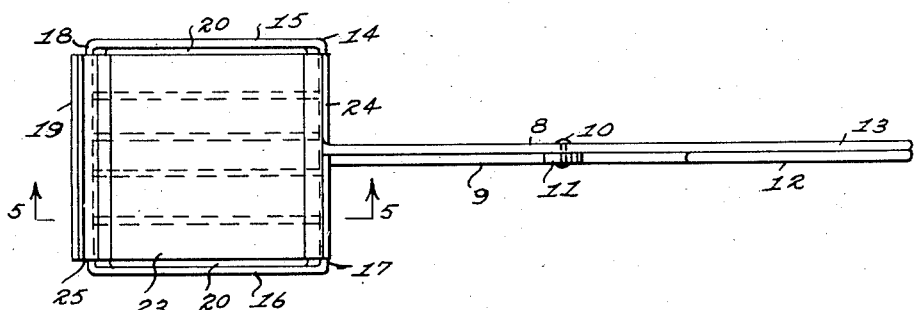
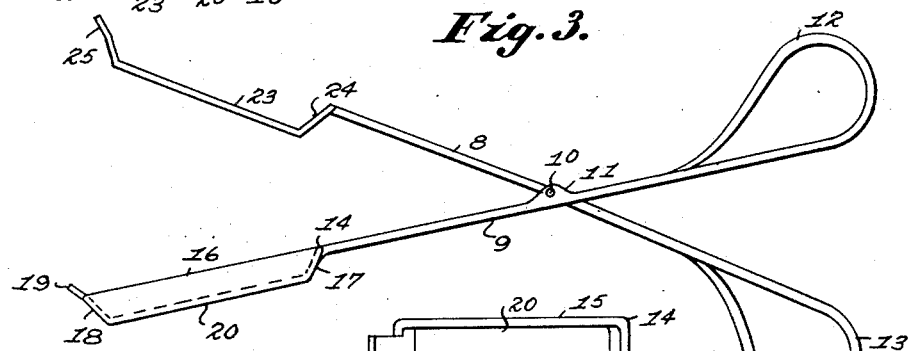
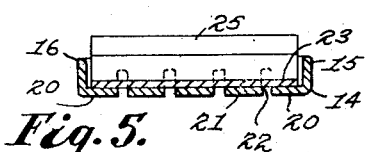
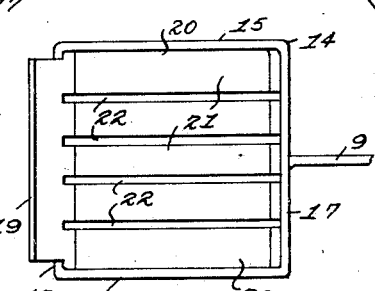
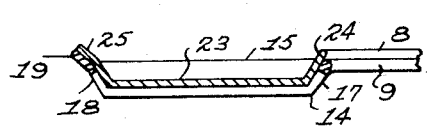
INVENTOR.
John F. Perry, Jr.
BY
McMorrow, Berman & Davidson
ATTORNEYS Patented Oct. 11, 1949

2,484,461

UNITED STATES PATENT OFFICE 2,484,461

TEA BAG AND BUFFET TONGS

John F. Perry, Jr., Chester, Pa.

Application June 4, 1948, Serial No. 31,191

3 Claims. (Cl. 294—106)

This invention relates to means for picking up tea bags and buffet servings, and particularly to special tongs adapted for such use.

The main object of my invention is to provide manually-operable means of the character indicated for picking up and conveniently squeezing tea bags to avoid waste of the tea and consequent dripping of tea on the saucer of the teacup being used.

Another object is to have such manually-operable means which will be effective as a buffet server to handle pickles, condiments and the like, to avoid the necessity of soiling the fingers and offering more convenience and more positive hold than afforded by forks and other cutlery.

A further object is to provide manually-operated tongs for the mentioned purposes which will also serve to pick up sliced luncheon meats and cheese from buffet servings, as well as slices of bread for making sandwiches and the like.

It is also an object to have special tongs of this character which may be readily manufactured from metal or plastic at a reasonable cost and which lends itself to light and neat construction to be normally classified with tableware.

Other objects and advantages of my invention will appear in further detail as the specification proceeds.

In order to facilitate ready comprehension of this invention for a proper appreciation of the salient features thereof, the invention is illustrated on the accompanying drawing forming part hereof, and in which:

Figure 1 is a side elevation of a tea bag and buffet tongs made according to the invention and embodying the same in a practical form;

Figure 2 is a top plan view of the same buffet tongs;

Figure 3 is another side elevation showing the tongs in open position;

Figure 4 is a transverse section taken on line 4—4 in Figure 1;

Figure 5 is a longitudinal section taken on line 5—5 in Figure 2;

Figure 6 is a fragmentary plan view of the lower scoop member of the two cooperating members forming the working ends of the tongs.

In the various views, the same reference numerals indicate the same or like parts.

At teas and buffet luncheons, etc., it is rather the custom to lift tea bags out of a teacup and transfer them in dripping condition to the associated saucer, upon which noticeable quantities of tea would soon drain out of the tea bag. Aside from being a nuisance to the person using the saucer, such drained tea is a sheer waste, while on the other hand, at buffet luncheons where sliced luncheon meats and cheese are served, it is sometimes awkward to pick up the latter upon the types of tableware used, and thus, there is apparently room for certain improvements in these directions. After due consideration of these problems, I have succeeded in designing a special type of manually-operated tea ball and buffet tongs which will avoid the mentioned disadvantages and serve the several purposes outlined in the foregoing objects, as will now be particularly described.

Hence, in the practice of my invention and referring again to the drawing, the tongs referred to are generally indicated at 7 in Figure 1. A pair of elongated arms 8 and 9 are pivoted together at 10, the rivet 10 passing through the main portion of arm 8 and a lug 11 upon the arm 9. At one end of arm 8 is a loop 12, while upon the corresponding end of arm 9 is another loop 13, these loops serving as finger grips by which to manipulate the arms in order to open and close them about the pivoting rivet 10. At the other end of arm 9 a rectangular wire frame 14 or scoop, as it may also be termed, best shown in Figure 6, consists of the two side walls 15 and 16, the rear inclined wall 17, which connects with arm 9 and the front wall 18. The rear and front walls 17 and 18 are inclined to the interior of the scoop member 14 and the front wall continued upwardly and forwardly in the form of a lip 19. The bottom of the scoop member 14 is subdivided into a plurality of longitudinal strips 20, 20 which are integral with the sides 15 and 16 and intermediate strips 21, 21, etc., these strips being separated by the longitudinal slots 22, 22 which extend from the rear to the front walls 17 and 18.

Upon the corresponding other or outer end of the other arm 8 is rigidly mounted a presser plate or leaf 23 having a rear wall 24 upwardly and rearwardly inclined toward the arm and integrally connected thereto, while at the forward end the plate 23 is bent upwardly and forwardly to form a lip 25 adapted to cooperate with lip 19 of the scoop member 14, while the plate 23 proper cooperates with the bottom sections or strips 20 and 21 of the mentioned scoop member.

The arrangement is such that if a tea bag is placed in the scoop member 14, when the tongs are open, as shown in Figure 3, and the handle loops 12 and 13 caused to approach each other, the pressure plate 23 will be brought upon the tea bag and the contents will be squeezed out through the slots 22, 22 between the strips 20 and 21 in such scoop member, after which the tongs may be opened and the tea bag deposited upon the saucer in usual fashion. In this case, however, it is evident that as the liquid contents of the tea bag have been expressed, the latter will be partly dry and will, therefore, not drain any fluid into the saucer or become a source of nuisance and hazard to the clothing of the person using the saucer. On the other hand, when the tongs are partly open, the lips 19 and 25 will, of course, be slightly separated so that if the lip 19 is thrust under the edge of a slice of cheese or luncheon meat and the lip 25 brought down upon the same by bringing the loops 12 and 13 together, the cheese or luncheon meat thus seized will be readily picked up and deposited upon the bread or the plate used by the guest handling the tongs. It is even evident that a lump of sugar may be picked up by the tongs so that the latter may also be considered a pair of sugar tongs, while other uses will also become obvious when these tongs are used at the table or at lunch, as for example, for picking up pickles, etc.

While I have described the scoop 14 and also the plate 23 as substantially rectangular in form, it is evident that the same can be made round or oval or of any other pleasing form so long as the principles remain, namely, that the bottom of the scoop member is slotted and both the scoop member and the plate above it have the forwardly-projecting cooperating lips which will serve to pick up meats, cheese and slices of other materials and articles of diet. It is also clear that the tongs may be made of plastic, sheet metal or the like, and preferably of quite light construction so that the same are readily manipulated and do not give the impression of being a tool, but rather a culinary article or an article of tableware to the user.

Manifestly, variations may be resorted to and parts and features may be modified or used without others within the scope of the appended claims.

Having now fully described my invention, I claim:

1. In tea bag and buffet tongs comprising a pair of elongated arms pivoted together at intermediate portions thereof, and each arm having a finger loop or grip portion by which to manipulate the tongs, the features which include upon the other or outer end of one arm a shallow scoop member with a perforate bottom therein, an outwardly and upwardly-projecting lip upon the end of the scoop member remote from the arm upon which it is mounted, a pressure plate fixed upon the corresponding other or outer end of the other arm above said scoop member and also having an outwardly and upwardly-projecting lip upon the end thereof in effective position to cooperate with the lip on said scoop member to seize slices of meat or cheese therebetween, the pressure plate being capable of squeezing a tea bag against the perforate bottom of the scoop member when the finger loops or grip portions are brought together.

2. In tea bag and buffet tongs comprising a pair of elongated arms pivoted together at intermediate portions thereof, and each arm having a finger loop or grip portion by which to manipulate the tongs, the features which include upon the other or outer end of one arm a shallow and substantially rectangular scoop member having inwardly-inclined front and rear walls and two side walls, a substantially flat bottom consisting of longitudinally-arranged strips connected to the front and rear walls with the two extreme strips connected to the side walls and all the strips spaced apart by longitudinal slots substantially parallel with the longitudinal axis of the arm upon which the scoop member is mounted, a forwardly and upwardly-projecting lip forming a continuation of the front wall or end of the scoop member remote from the latter arm, a substantially rectangular pressure plate having an upwardly-extending rear wall secured directly to the corresponding other or outer end of the other arm and being disposed above said scoop member, and an outwardly and upwardly-projecting end wall forming a lip cooperating with the lip upon the scoop member to seize a slice of meat or cheese therebetween, and the pressure plate cooperating with said scoop member to squeeze a tea bag against the bottom strips thereof when the finger loops or grip portions are brought together.

3. In tea bag and buffet tongs comprising a pair of elongated arms pivoted together at intermediate portions thereof, and each arm having a finger loop or grip portion by which to manipulate the tongs, the features which include upon the other or outer end of one arm a shallow scoop member having a bounding wall about the edge thereof, a plurality of strips spaced apart by elongated slots forming the bottom thereof with the strips longitudinally disposed in substantial parallelism with the longitudinal axis of the arm upon which the scoop is mounted, a lip projecting outwardly and upwardly from the end of the scoop member upon the wall thereof remote from the latter arm, a pressure plate secured to the corresponding other outer end of the other arm at one end of said pressure plate, and a lip projecting outwardly and upwardly from the other end of said pressure plate in effective position to cooperate with the lip on the scoop member to seize slices of meat or cheese therebetween, the pressure plate being capable of squeezing a tea bag against the strips forming the bottom of said scoop member when the finger loops or grip portions upon the arms are brought together.

JOHN F. PERRY, JR.

No references cited.